United States Patent [19]
Bonne et al.

[11] 3,960,438
[45] June 1, 1976

[54] REFLECTIVE DISPLAYS

[75] Inventors: Ulrich Bonne, Hopkins, Minn.;

[73] Assignee: Honeywell Inc., Minneapolis, Minn.

[22] Filed: Dec. 1, 1972

[21] Appl. No.: 311,184

[52] U.S. Cl. .......................... 350/160 LC; 350/288; 350/150
[51] Int. Cl.² .......................................... G02F 1/26
[58] Field of Search ..... 350/144, 150, 157, 160 LC, 350/288

[56] References Cited
UNITED STATES PATENTS

| | | |
|---|---|---|
| 3,248,165 | 4/1966 | Marks et al. ..................... 350/144 |
| 3,531,182 | 9/1970 | Land et al. ......................... 350/150 |
| 3,544,195 | 12/1970 | Cameron ........................... 350/157 |
| 3,592,527 | 7/1971 | Conners ............................ 350/150 |
| 3,609,002 | 9/1971 | Fraser ................................ 350/150 |
| 3,625,591 | 12/1971 | Freiser .............................. 350/150 |
| 3,756,694 | 9/1973 | Soref ................................. 350/160 |
| 3,807,831 | 4/1974 | Soref ................................. 350/150 |

*Primary Examiner*—R. V. Rolinec
*Assistant Examiner*—Michael J. Tokar
*Attorney, Agent, or Firm*—David R. Fairbairn

[57] ABSTRACT

Electrically controllable reflective displays are formed which utilize ambient light and which can be viewed from a wide angular view.

13 Claims, 4 Drawing Figures

REFLECTIVE DISPLAYS

BACKGROUND OF THE INVENTION

The present invention relates to electrically controllable displays. In particular, the present invention discloses reflective displays which utilize ambient light and which have a wide angle of view.

In recent years, extensive research on electrically controllable display media has been performed. One type of display medium which has received considerable attention is fine-grained optically birefringent ferroelectric ceramics, as described in U.S. Pat. Nos. 3,499,704 by Land et al; 3,513,864 by Haertling et al; 3,531,182 by Land et al; and 3,609,002 by Fraser et al. One particularly advantageous ferroelectric ceramic material is lanthanum-modified lead zirconate titanate (PLZT).

A second widely studied type of display medium is liquid crystals, particularly liquid crystals of the nematic phase. Some of the many applications of liquid crystals are described by Fergason et al, "Liquid Crystals and Their Applications," *Electro-Technology*, 41 (January, 1970). Liquid crystals may operate in a variety of modes, including the birefringent and dynamic scattering modes of operation.

A third type of display medium is a colloidal suspension of dielectric needles. This type of display medium was described by A. M. Marks, "Electro-optical Characteristics of Dipole Suspensions," *Applied Optics*, 8, 1397 (1969).

Although there has been some investigation of liquid crystal dynamic scattering mode reflective displays (see U.S. Pat. No. 3,499,702 by Goldmacher et al; U.S. Pat. No. 3,592,527 by Conners et al; and U.S. Pat. No. 3,625,591 by Freiser et al), most of the research and engineering effort has been directed toward transmissive rather than reflective displays. A reflective display utilizing ambient light is highly advantageous since no display light source is required, as in most transmissive displays. Thus the size, power consumption, and cost of a reflective display utilizing ambient light may be less than a similar transmissive display.

To be successful, a reflective display should be visible throughout a relatively wide viewing angle range. This allows several observers to view the display simultaneously or the same observer to view the display from a variety of positions.

SUMMARY OF THE INVENTION

The reflective displays of the present invention utilize ambient light and have a wide angle of view. In one embodiment an electro-optic medium is positioned between circular polarizer means and non-depolarizing diffuse reflector means. The electro-optic medium has electrically controllable birefringence. Electrode means apply an electric field to selected regions of the electro-optic medium to vary the birefringence of the selected regions.

DETAILED DESCRIPTION OF THE PREFERRED EMBODIMENT

Figure 1:
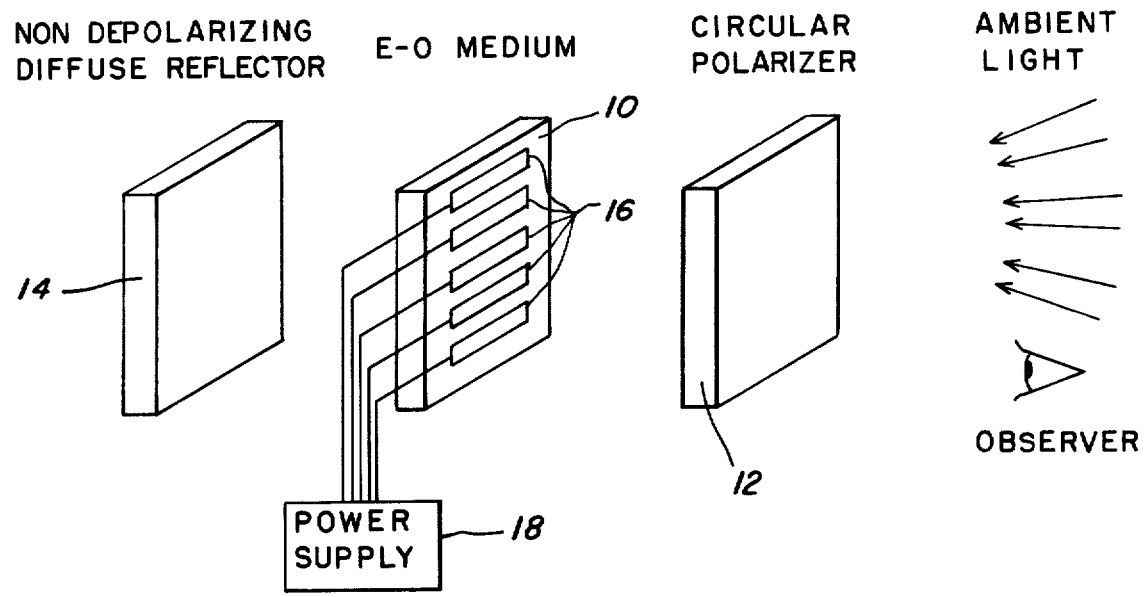
FIG. 1 shows a reflective display having a fine-grained optically birefringent ferroelectric plate as a display medium.

In FIG. 1 is shown a reflective display utilizing ambient light and having a wide angle of view. Electro-optic medium 10 has electrically controllable birefringence. In the embodiment shown in FIG. 1, electro-optic medium 10 is a fine-grained optically birefringent ferroelectric ceramic plate such as PLZT. Electro-optic medium 10 is positioned between circular polarizer 12 and non-depolarizing diffuse relfector 14. Electrodes 16 apply an electric field to selected regions of electro-optic medium 10 to vary the birefringence of the selected regions. Power supply 18 provides electrical power to electrodes 16. Electrodes 16 may take many different forms, depending upon the particular information desired to be displayed.

The reflective display of FIG. 1 operates in the following manner. Ambient light passes through circular polarizer 12 and is circularly polarized, and then passes through electro-optic medium 10. The polarization of ambient light passing through an unenergized region of electro-optic medium 10 is unchanged. The light then strikes reflector 14 and is reflected back toward the circular polarizer 12. Since reflector 14 is a non-depolarizing diffuse reflector, the polarization of the light is only slightly altered by reflection. The reversal of propagation direction of the light, however, causes the light to be circularly polarized in the opposite sense. The light again passes through the unenergized region and is unchanged in polarization. When the light reaches circular polarizer 12, it is blocked because it is circularly polarized in the opposite sense.

When an electric field is applied to a selected region of electro-optic medium 10, the selected region functions as a quarter-wave plate. Circularly polarized light passing through a selected region becomes linearly polarized. After being reflected back by non-depolarizing diffuse reflector 14, the linearly polarized light passes back through the selected region and receives an additional quarter-wave retardation. The reflected linearly polarized light thus becomes circularly polarized again in the proper direction so that it passes through circular polarizer 12 to the observer. Thus the selected regions of the display appear as bright regions in a black background.

Circular polarizer 12 may comprise a linear polarizer in combination with a quarter-wave plate whose principal axis is oriented at 45° to the polarization direction of the linear polarizer. Suitable linear polarizer-quarter-wave plate combinations include Polaroid HNCP 37 neutral and HACP 24 amber. When a linear polarizer-quarter-wave plate combination is used as circular polarizer 12, it can be seen that the quarter-wave plate may be positioned either between the linear polarizer and the electro-optic medium or between the electro-optic medium and the non-depolarizing diffuse reflector.

Although non-depolarizing diffuse reflector 14 may take many forms, in the preferred embodiment of the present invention it is formed by grinding, sandblasting, or etching the back surface of the ferroelectric ceramic plate. A thin layer of reflective metal such as aluminum, silver, chromium, or nickel is deposited on the roughened surface. The resulting diffuse reflecting surface causes only a slight alteration of the polarization of the light. This embodiment is particularly advantageous since it minimizes the space between the electro-optic medium and the non-depolarizing diffuse reflector, thus maximizing display resolution. In addition, the display is more rugged since the non-depolarizing diffuse reflector is an integral part of the ferroelectric ceramic plate.

Experimental observations and theoretical calculations indicate that with a PLZT ferroelectric ceramic plate as the display medium an observer can displace himself over a range of viewing angles of about ±50° without experiencing a change in the displayed color. The reflective display of the present invention is therefore capable of having a wide angle of view.

Figure 2:
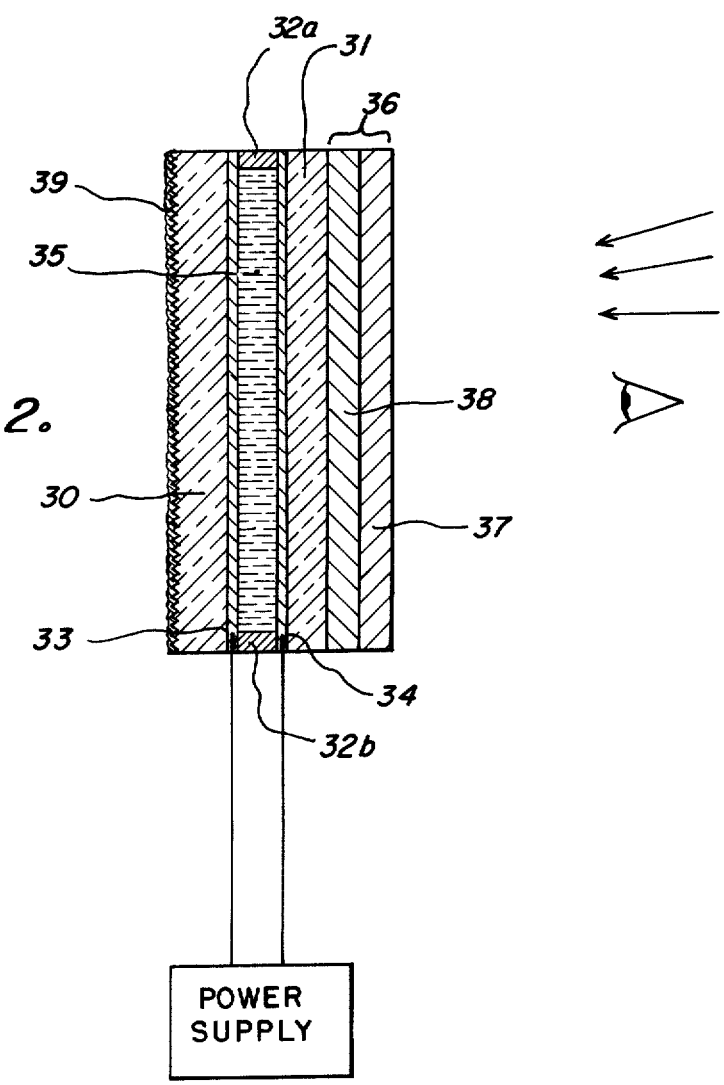
FIG. 2 shows a reflective display having as its display medium a birefringence mode nematic liquid crystal.

FIG. 2 shows another reflective display using a birefringence mode nematic liquid crystal. Transparent support plates 30 and 31 are parallel and spaced apart by spacers 32a and 32b. Transparent electrodes 33 and 34 are positioned on opposing surfaces of transparent support plates 30 and 31. Electrodes 33 and 34 are the means by which an electric field is applied to selected regions of the display device. The nematic liquid crystal material 35 fills the space between support plates 30 and 31. Circular polarizer means 36 comprising linear polarizer 37 and quarter-wave plate 38 is positioned adjacent the front support plate 31. The front surface of linear polarizer 37 is antireflection coated to minimize unwanted reflection of ambient light at the front surface of linear polarizer 37. Non-depolarizing diffuse reflector 39 comprises the roughened back surface of transparent support plate 30 upon which a thin reflective metal layer such as aluminum, silver, chromium, or nickel is deposited. The roughness of the back surface has been exaggerated for illustrative purposes.

In the preferred embodiment shown in FIG. 2, the nematic liquid crystal material has negative dielectric anisotropy. In other words, the molecular or optic axis of the liquid crystal material is oriented perpendicular to the direction of the maximum low frequency dielectric constant of the liquid crystal molecules. The molecular axes of the liquid crystal molecules are aligned perpendicular to the surfaces of support plate 30 and 31 by one of several known techniques such as special cleaning methods or rubbing with lecithin. The optic axis of the liquid crystal is therefore oriented perpendicular to the surfaces of the support plates 30 and 31. Thus the cell exhibits minimum birefringence when no electric field is applied and increasing birefringence as an electric field is applied. It can be seen that the reflective displays of FIGS. 1 and 2 operate in a similar manner. In FIG. 1 the electro-optic medium having electrically controllable birefringence is a fine-grained optically birefringent ferroelectric ceramic plate, whereas in FIG. 2 the electro-optic medium is a nematic liquid crystal which is operated in the birefringence mode.

Figure 3:
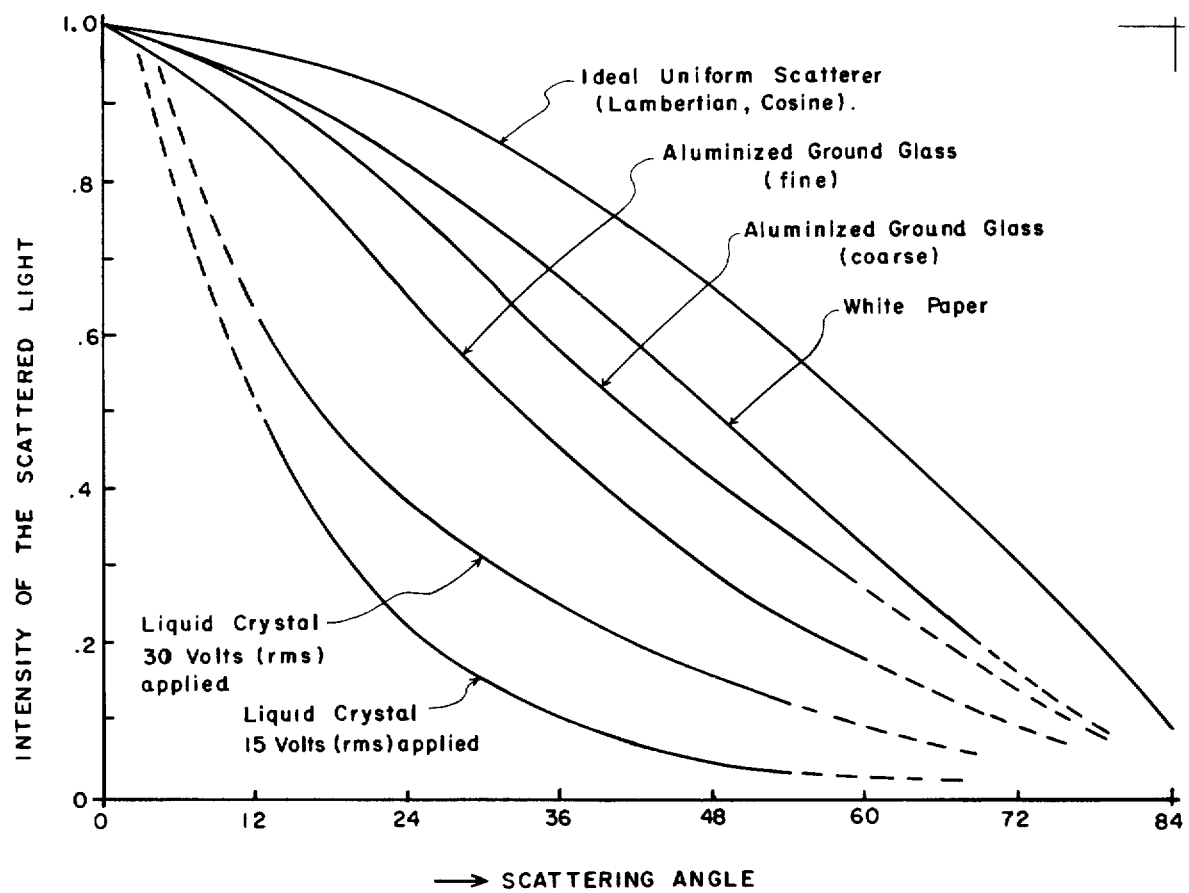
FIG. 3 compares the reflection characteristics of the preferred diffuse reflectors with an ideal Lambertian scattering surface and with white paper.

In FIGS. 1 and 2 the preferred non-depolarizing diffuse reflector has been described as a roughened surface upon which a thin reflective metal layer is deposited. This preferred non-depolarizing diffuse reflector is highly advantageous since it is very simply constructed. The reflection characteristics of the reflector may depend somewhat on the technique used to roughen the surface. FIG. 3 shows the intensity of scattered light as a function of scattering angle for an ideal Lambertian scattering surface, white paper, and finely and coarsely ground surfaces upon which a thin reflective aluminum layers were deposited. It can be seen that both of the preferred diffuse reflectors exhibit light reflecting characteristics which are very close to the characteristics of widely used and accepted white paper. The preferred diffuse reflectors show a considerable improvement in contrast uniformity and independence of viewing angle over conventional plane specular reflectors or even common liquid crystal displays operated in the dynamic scattering mode.

Figure 4:
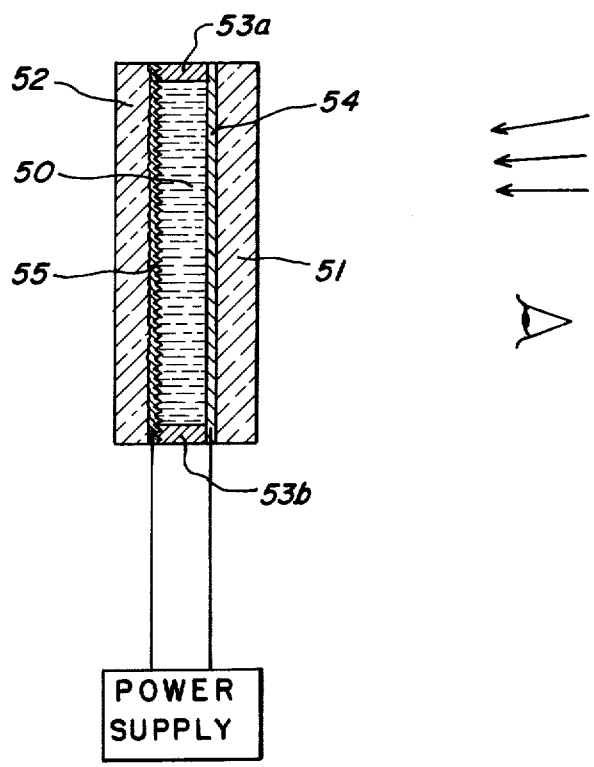
FIG. 4 shows a reflective display having a colloidal suspension of dielectric needles as a display medium.

FIG. 4 shows a reflective display using a colloidal suspension of dielectric needles such as herapathite suspension as an electrically controllable optical medium. The colloidal suspension of dielectric needles 50 are positioned between two support plates 51 and 52. Spacers 53a and 53b maintain support plates 51 and 52 in a spaced relationship. A transparent electrode pattern such as a 7-segment numerical display pattern is disposed on the inner surface of transparent support plates 51. For purpose of illustration, the electrode pattern is shown as a single electrode 54. The inner surface of support plate 52 is a roughened surface. A thin reflecting metal layer 55, which is preferably aluminum or silver, is deposited on the roughened surface and forms a diffuse reflector for the reflective display as well as a common electrode. The thin reflecting metal layer is inert to organic liquids such as herapathite suspension and therefore may be brought into direct contact with the display medium. This is particularly advantageous since parallax problems can arise if the diffuse reflector is positioned proximate the back surface of support plate 52, as was used in FIG. 2 for reasons of obtaining optimum liquid crystal alignment.

In conclusion, electrically controllable reflective displays which utilize ambient light and which have a wide angle of view have been described. These reflective displays eliminate the need for a display light source, as is required in most transmissive mode displays. The electrically controllable optical medium may be one of many, including a fine-grained optically birefringent ferroelectric ceramic plate, a nematic liquid crystal operated in the birefringence mode, or a colloidal suspension of dielectric needles. Although this invention has been described with reference to a series of preferred embodiments it should be understood that changes in form and detail may be made without departing from the spirit and scope of the invention.

I claim:

1. A reflective display utilizing ambient light and having a wide angle of view, the reflective display comprising:
   an optical medium having an electrically controllable optical property,
   electrode means for applying an electric field to selected regions of the optical medium to vary the electrically controllable optical property of the selected regions, and
   diffuse reflector means positioned proximate one surface of the optical medium, the diffuse reflector means comprising a roughened surface and a thin reflective metal layer deposited on the roughened surface.

2. The reflective display of claim 1 wherein the optical medium is a colloidal suspension of dielectric needles.

3. The reflective display of claim 2 wherein the colloidal suspension of dielectric needles is disposed between first and second glass plates.

4. The reflective display of claim 3 wherein the roughened surface is one surface of the second glass plate.

5. The reflective display of claim 4 wherein the thin reflective metal layer is in contact with the colloidal suspension of dielectric needles.

6. The reflective display of claim 1 wherein the optical medium is a fine-grained, optically birefringent ferroelectric ceramic plate.

7. The reflective display of claim 6 wherein the ferroelectric ceramic plate has first and second surfaces and wherein the electrode means are attached to the first surface and the roughened surface is the second surface of the ferroelectric ceramic plate.

8. The reflective display of claim 1 wherein the thin reflective metal layer is aluminum.

9. The reflective display of claim 1 wherein the thin reflective metal layer is silver.

10. A reflective display utilizing ambient light and having a wide angle of view, the reflective display comprising:
circular polarizer means,
non-depolarizing diffuse reflector means comprising a roughened surface and a thin reflective metal layer deposited on the roughened surface,
an electro-optic medium having electrically controllable birefringence, the electro-optic medium being positioned between the circular polarizer means and the non-depolarizing diffuse reflector means, and
electrode means for applying an electric field to selected regions of the electro-optic medium to vary the birefringence of the selected regions.

11. The reflective display of claim 10 wherein the thin reflective metal layer is aluminum.

12. The reflective display of claim 10 wherein the thin reflective metal layer is silver.

13. The reflective display of claim 10 wherein the electro-optic medium is a fine-grained, optically birefringent ferroelectric ceramic plate, and wherein the roughened surface is one surface of the ferroelectric ceramic plate.

* * * * *